(12) United States Patent
Lebigre

(10) Patent No.: US 11,572,952 B2
(45) Date of Patent: Feb. 7, 2023

(54) SHAFT SEALING ARRANGEMENT

(71) Applicant: Dresser-Rand SAS, Seine-Maritime (FR)

(72) Inventor: Olivier Lebigre, Rolleville (FR)

(73) Assignee: Dresser-Rand SAS, Le Havre (FR)

( * ) Notice: Subject to any disclaimer, the term of this patent is extended or adjusted under 35 U.S.C. 154(b) by 0 days.

(21) Appl. No.: 17/334,718

(22) Filed: May 29, 2021

(65) Prior Publication Data

US 2022/0381349 A1 Dec. 1, 2022

(51) Int. Cl.
*F16J 15/34* (2006.01)
*F04D 29/12* (2006.01)
*F16J 15/447* (2006.01)

(52) U.S. Cl.
CPC ........ *F16J 15/3404* (2013.01); *F04D 29/124* (2013.01); *F16J 15/447* (2013.01); *F16J 15/3484* (2013.01)

(58) Field of Classification Search
CPC .... F16J 15/3404; F16J 15/447; F16J 15/3484; F16J 15/346; F16J 15/4476; F16J 15/4478; F04D 29/124
See application file for complete search history.

(56) References Cited

U.S. PATENT DOCUMENTS

| | | | | |
|---|---|---|---|---|
| 2,352,336 | A * | 6/1944 | Martin | F16C 33/74 416/174 |
| 3,701,488 | A * | 10/1972 | Fisher | D21D 1/30 241/259.1 |
| 5,078,410 | A | 1/1992 | Warman et al. | |
| 9,366,340 | B2 * | 6/2016 | Grimanis | F16J 15/447 |
| 2014/0030063 | A1 | 1/2014 | Mateman | |
| 2018/0128380 | A1* | 5/2018 | Tones | F16J 15/4478 |

FOREIGN PATENT DOCUMENTS

| DE | 2322458 A1 | 11/1974 |
|---|---|---|
| DE | 7141842 U | 11/1974 |
| EP | 2497977 A1 | 9/2012 |

* cited by examiner

*Primary Examiner* — Gilbert Y Lee
(74) *Attorney, Agent, or Firm* — Wolter Van Dyke Davis, PLLC

(57) ABSTRACT

A shaft sealing arrangement includes a first seal and a second seal, wherein the first seal is designed in the form of a lip seal and the second seal is designed in the form of a mechanical seal. When the shaft is at a standstill, the lip seal performs the sealing action and, when the shaft is rotating, the mechanical seal performs the sealing action.

13 Claims, 3 Drawing Sheets

SHAFT SEALING ARRANGEMENT

FIELD OF INVENTION

The invention relates to a shaft sealing arrangement comprising a shaft, which is mounted in a rotatable manner and extends along an axial axis, a stator, which is arranged around the shaft, and a rotating sealing ring, which is connected to the shaft, wherein a first gap is formed between the stator and the shaft, wherein the stator has a first sealing surface, which is arranged downstream of the first gap, as seen in a radial direction, wherein the sealing ring has a second sealing surface, which is arranged in a position opposite the first sealing surface, wherein a second gap is formed between the first sealing surface and the second sealing surface.

BACKGROUND OF INVENTION

Shaft seals are required, in particular, in turbomachines, for example in gas turbines, steam turbines or compressors. All of these turbomachines have in common that a flow medium which is present in the turbomachine has to be prevented from escaping from the turbomachine. The turbomachines has a rotatably mounted shaft, which is usually enclosed by a stator, for example a turbine housing. The rotatable shaft and the stator usually have between them a gap through which the flow medium can flow, it being necessary for this to be prevented or at least minimized.

Use is therefore made of different types of shaft-sealing arrangement in order to prevent flow medium from flowing out. Labyrinth seals, brush seals or mechanical seals are known in this context. Other types of shaft-sealing arrangement are also known. A comprehensive listing of the various shaft-sealing arrangements has not been included here.

In relation to the labyrinth seals, which are of comparatively straightforward construction, the modern dry gas seals are comparatively challenging as far as the operating conditions are concerned. Reliable operation of dry gas seals is possible only when a sliding film of dry gas between the two sealing rings is constantly supplied with gas which has been treated to a high quality. The gas for supplying the gas film between the sealing rings, on the one hand, has to have been dried to a sufficient extent and, on the other hand, also has to be comparatively free of foreign bodies. The amount of space, and the investment costs, required by the auxiliary systems, for example of a process-gas compressor, which are necessary for the gas treatment must be taken into account.

There are known operating conditions in which the sealing action of a shaft-sealing arrangement has to meet different requirements. It can thus be the case that, in the standstill state, i.e. when the shaft is not rotating, the sealing action required for the shaft seal is different to that required during operation, i.e. when the shaft is rotating, it being possible for this rotation to take place, for example, at nominal speed. There are operating conditions which require the best possible sealing action in the standstill state and require the sealing action to decrease during operation, i.e., for this operating condition, a flow of a medium between the rotating shaft and the stator is very much desirable.

For example lip seals, as illustrated in FIG. 1, are known. FIG. 1 therefore illustrates a known lip seal according to the prior art.

A shaft 2 here, which is mounted in a rotatable manner about an axis of rotation 1, is arranged in a position opposite a stator 3. A lip seal 5 is arranged in a recess 4 in the stator. The lip seal 5 forms a V shape, as seen in cross section. The lip seal 5 here is formed around the entire circumference 6. The lip seal 5 is formed here such that there is slight contact with an inner surface 7 of the recess 4. Contact likewise takes place between the lip seal 5 and a surface 8 of the shaft 2. The lip seal 5 here has an upper limb 9 and a lower limb 10. The upper limb 9 is in contact with the surface 7 of the recess 4 of the stator. The lower limb 10 is in contact with the surface 8 of the shaft 2. At high rotational speeds, this contact results in a temperature increase and wear. The lip seals are therefore formed rather more for lower rotational speeds. For higher speeds, use is made rather more of contactless seals, e.g. labyrinth seals. However, these types of seal are less effective at lower rotational speeds.

SUMMARY OF INVENTION

It is an object of the invention to create a shaft-sealing arrangement which in the standstill state, i.e. in a state with little, if any, rotation of the shaft, exhibits a good sealing action and in the operational state, at for example nominal speed, exhibits a lesser sealing action in relation to the standstill state.

This object is achieved by a shaft-sealing arrangement comprising a shaft, which is mounted in a rotatable manner and extends along an axial axis, a stator, which is arranged around the shaft, and a rotating sealing ring, which is connected to the shaft, wherein a first gap is formed between the stator and the shaft, wherein the stator has a first sealing surface, which is arranged downstream of the first gap, as seen in a radial direction, wherein the sealing ring has a second sealing surface, which is arranged in a position opposite the first sealing surface, wherein a gap is formed between the first sealing surface and the second sealing surface and a sealing unit is arranged in the second gap, in the sealing ring, on the second sealing surface.

The invention proceeds from the idea the second sealing unit exhibits a good sealing action during standstill. It is possible here for a good sealing action during operation to be realized even by a narrow gap. This means that the first sealing unit can be designed in the form of a first gap which is as narrow as possible.

This provides for a sealing action for a comparatively large number of operational states.

Advantageous developments are specified in the dependent claims.

Provision is thus made, in a first advantageous development, for the second sealing unit to be designed such that it seals the second gap when the shaft is not rotating and allows flow through the second gap when the shaft is rotating.

The second sealing unit is therefore designed optimally for the standstill state, i.e., in the standstill state, the second sealing unit predominantly performs the sealing action between the shaft and the stator. At higher rotational speeds, the first sealing unit predominantly performs the sealing action.

In a further advantageous development, the second sealing unit is designed in the form of a lip seal. The lip seal here, as illustrated in FIG. 1, has a first limb and a second limb, which form a V shape, as seen in cross section. The lip seal is designed here such that, in the standstill state, an angle $\alpha$ is formed between the first limb and second limb. This angle $\alpha$ is reduced under the action of centrifugal force, which prevails when the shaft is rotating. In other words, the V shape becomes more acutely angled under the action of centrifugal force.

In a further advantageous development, the stator has a recess, which is formed in a circumferential direction, wherein the first sealing surface is part of the recess and is arranged in a position opposite the first gap.

The sealing ring advantageously has a protrusion, which projects into the recess such that the second sealing surface is arranged in a position opposite the first sealing surface.

The invention therefore makes provision for the rotating part of the shaft-sealing arrangement which comprises the protrusion to project into the recess of the stator. The lip seal is arranged within the protrusion. The lip seal within the protrusion therefore experiences a change in geometry on account of the centrifugal force. The first sealing surface, which is formed in the stator, is arranged within the recess. In relation to the axis of rotation, the first sealing surface is located downstream of the first gap, as seen in the radial direction.

In a further advantageous development, the first sealing surface is formed essentially parallel to the axial axis.

In a further advantageous development, the first sealing unit, in the first gap, is designed in the form of a labyrinth seal.

In a particularly advantageous development, a mechanical seal, in particular a dry gas seal, which comprises a slide ring, is formed alongside the sealing ring. The mechanical seal comprises a sealing body, which butts against the sealing ring, adjacent thereto. The slide ring is arranged adjacent to the sealing body. A gas flows, via a gas infeed, between the sealing body and the slide ring. This gas has to be particularly dry and clean and is fed via a specific gas infeed. The sealing action of the mechanical seal is good particularly in the operational state, in which the shaft is rotating. This means that a relative speed prevails between the sealing body and the slide ring. In contrast, in the standstill state, the sealing action of the mechanical seal is not optimum, and therefore the second sealing unit predominantly performs the sealing action.

The gas infeed is advantageously designed such that a gas can be fed between the stator and the sealing ring.

The properties, features and advantages of the invention described above, and the manner in which they are achieved, will be more clearly and distinctly comprehensible in conjunction with the following description of the exemplary embodiments, which will be explained in more detail in conjunction with the drawings. Like components, or components with like functions, are indicated here by like reference signs.

Exemplary embodiments of the invention will be described hereinbelow with reference the drawing. These are not intended to illustrate the exemplary embodiments to scale; rather, the drawing, also useful for explanatory purposes, is in schematic and/or slightly distorted form. In order to supplement the teachings which are directly evident in the drawing, reference is made to the relevant prior art.

DETAILED DESCRIPTION OF INVENTION

Figure 1:
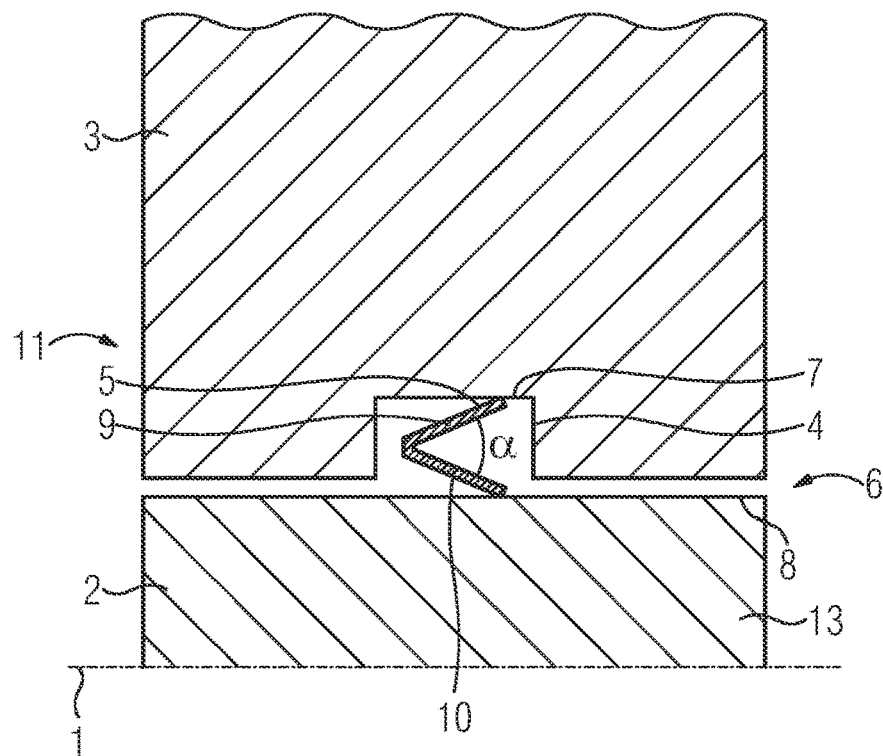
FIG. 1 shows a sealing arrangement according to the prior art.
Figure 2:
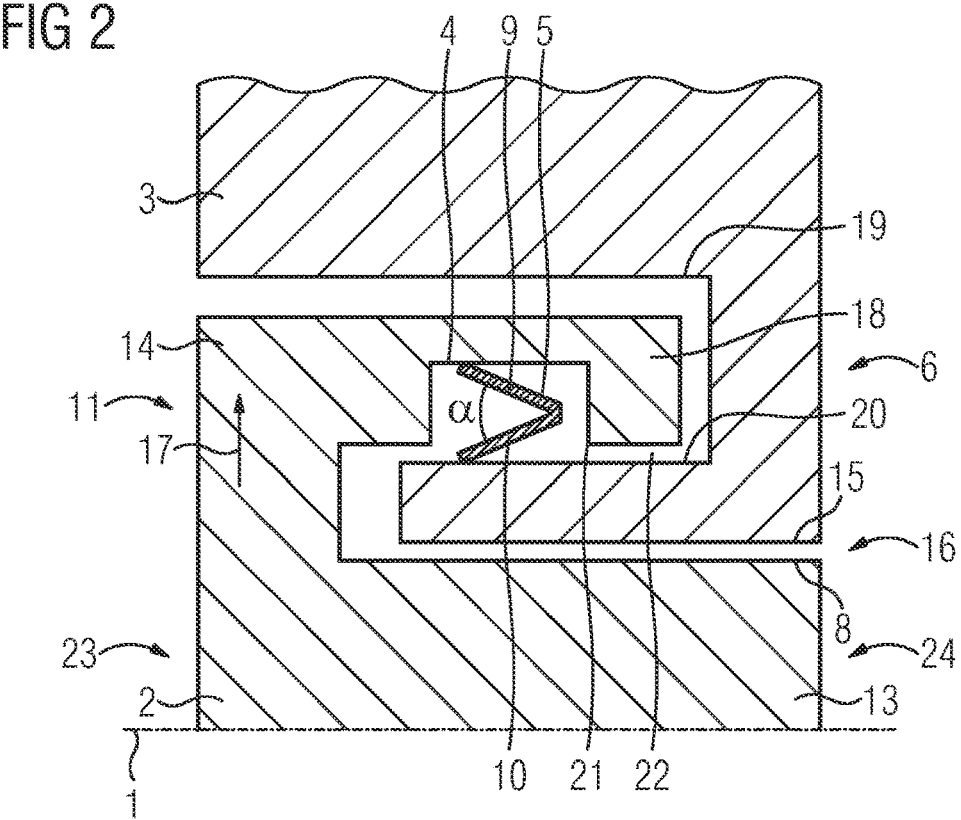
FIG. 2 shows a sealing arrangement according to the invention.

FIG. 2 shows a shaft-sealing arrangement 11 according to the invention. The difference between the shaft-sealing arrangement 11 and the shaft-sealing arrangement according to FIG. 1 is that the shaft has a rotating sealing ring 13 which is of extended design in comparison with the sealing ring 13 according to FIG. 1, the second sealing ring 14 being arranged in the extension.

The sealing ring 13 comprises a surface 8, which is arranged opposite a surface 15 of the stator 3. A first gap 16 is formed between the surface 15 and the surface 8. A first sealing unit is arranged in this first gap 16. The first sealing unit can be optimized spacing in the first gap 16. In an alternative embodiment, the first sealing unit can be a labyrinth seal.

The sealing ring 13 is designed to be extended in a radial direction 17 (as seen in relation to the axis of rotation 1). The extension of the sealing ring 13 has a protrusion 18, which projects into a recess 19 in the stator 3. This gives rise to a first sealing surface 20 on the stator 3, said sealing surface being arranged downstream of the first gap 16. A second sealing surface 21 is arranged on the protrusion 18 of the sealing ring 13, in a position opposite the first sealing surface 20. The first sealing surface 20 is formed essentially parallel to the axis of rotation 1. As a result, the second sealing surface 21 is also formed essentially parallel to the axis of rotation 1.

The second sealing surface 21 has a recess 4, in which the second sealing unit 14 is arranged. A second gap 22 is formed between the first sealing surface 20 and the second sealing surface 21.

This shaft-sealing arrangement 11 separates an exterior space 23 from an interior space 24 in terms of flow. The first sealing unit here, in the first gap 16, performs the sealing task during operation, while the shaft 2 is rotating, and the second sealing unit 14, in the second gap 22, performs the sealing action during standstill (when the shaft is not rotating).

Figure 3:
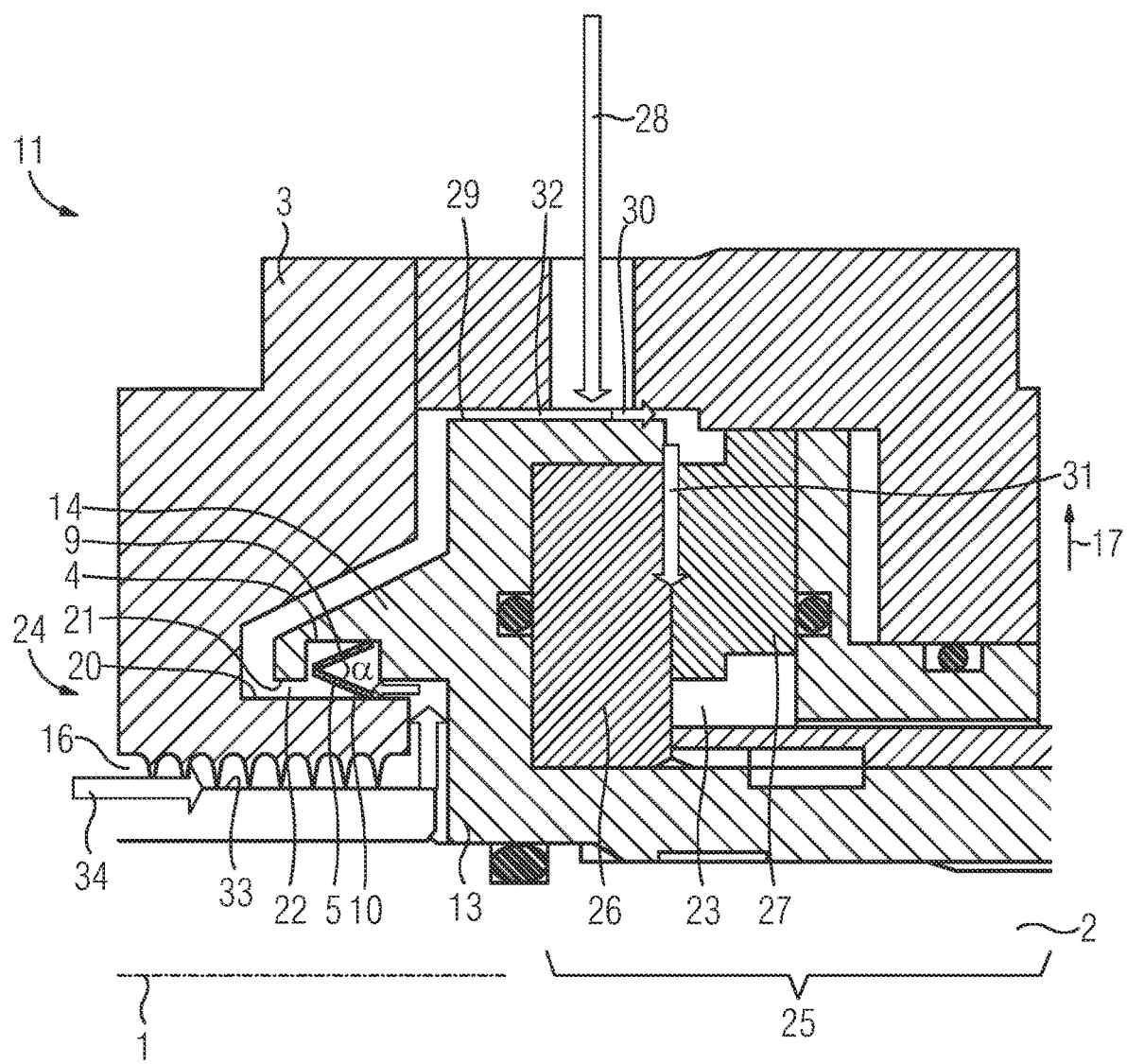
FIG. 3 shows a sealing arrangement according to the invention, alongside a mechanical seal, at a standstill.

FIG. 3 shows a further embodiment of the shaft-sealing arrangement 11 according to the invention in conjunction with a mechanical seal 25. The mechanical seal 25 essentially comprises a sealing body 26, which is arranged adjacent to a slide ring 27. The sealing body 26 is connected to the sealing ring 13, and therefore the sealing body 26 can be rotated. The slide ring 27, in contrast, is connected to the stator 3 at a fixed location, and therefore, when the shaft 2 is rotating, this gives rise to relative movement between the sealing body 26 and the slide ring 27. A gas infeed 28 is formed in the stator 3, said gas infeed feeding a gas to the shaft-sealing arrangement 11. The gas here flows first of all onto an upper part 29 of the slide ring 27. From there, the gas stream splits into a first branch 30, which leads to the mechanical seal 25 and flows there between the sealing body 26 and the slide ring 27. In FIG. 3, the arrow 31 symbolizes the movement of the gas between the sealing body 26 and the slide ring 27. The gas then flows pretty much into an exterior space 23.

Small flow in a second branch 32 takes place, counter to that of the first branch 30, in the direction of the second sealing unit 14. The second sealing unit 14 is designed in a manner identical to the second sealing unit 14 according to FIG. 2. For reasons of clarity, some reference signs have been omitted.

FIG. 3 shows the standstill state. This means that the shaft 2 is not rotating. The second sealing unit 14 therefore predominantly performs the sealing action (is sealing hermetically). This means that the lip seal 5 is in abutting contact with the first sealing surface 20 and thus gives rise to an optimum sealing action. A gas contaminated by way of an interior space 24 can flow, in part, through the first gap 16, in which a labyrinth seal 33 is arranged. This is symbolized by the arrow 34. However, the contaminated stream (arrow 34) can pass, via further gaps, only as far as the lip seal 5, and cannot reach the mechanical seal 25, which could result in the mechanical seal 25 being damaged. According to the prior art, a permanent inflow would be fed here to the gas infeed 28, which would counteract the contaminated stream 34. The present invention can essentially dispense with this constant inflow. This results in further cost-cutting measures.

Figure 4:
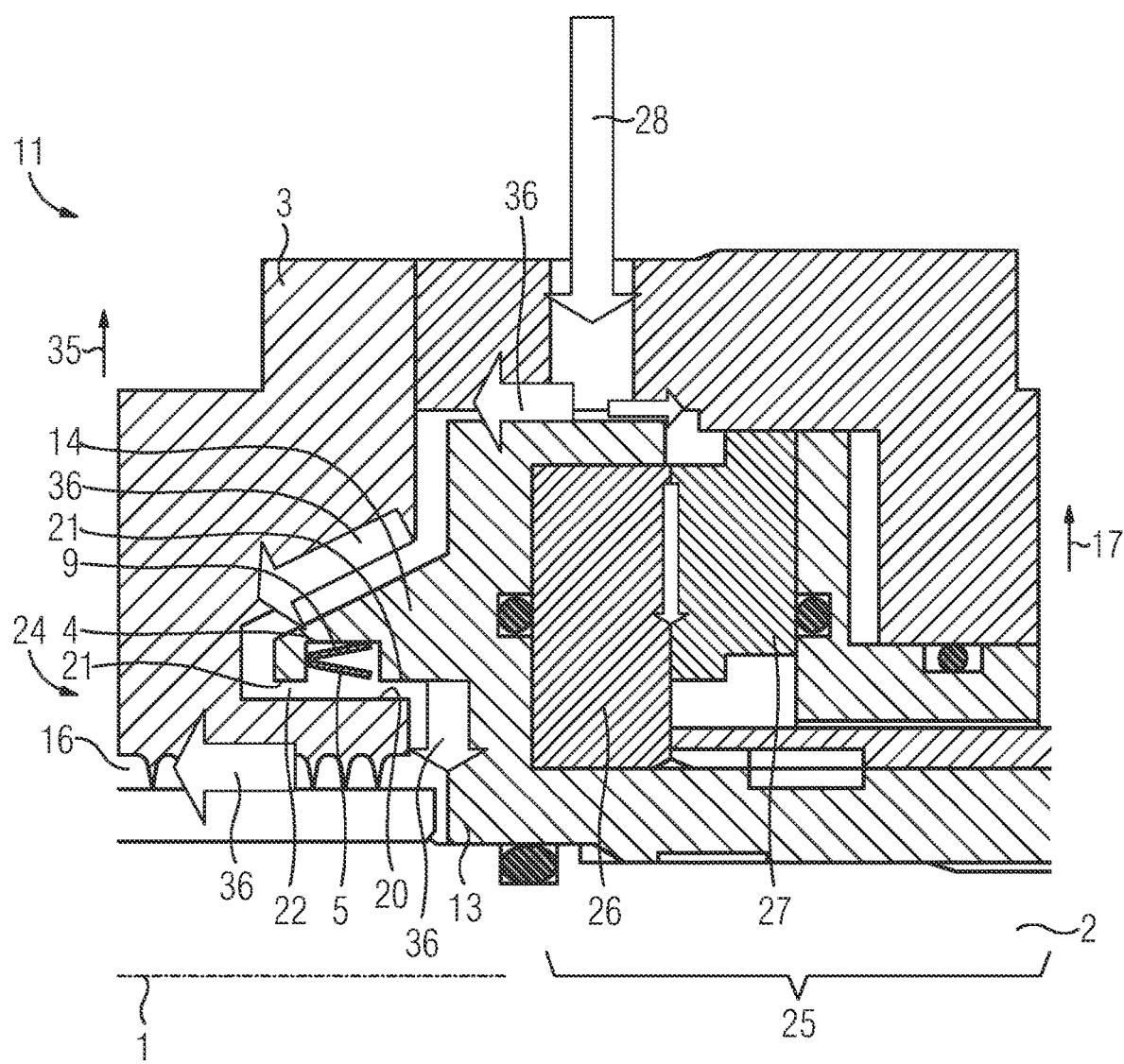
FIG. 4 shows a sealing arrangement according to the invention from FIG. 3 during operation (when the shaft is rotating).

That embodiment of the shaft-sealing arrangement 11 which is shown in FIG. 4 has identical design features to the shaft-sealing arrangement 11 according to FIG. 3. The difference between FIG. 4 and FIG. 3 is that FIG. 4 shows the state during operation, that is to say when the shaft is rotating. As can be seen in FIG. 4, the lip seal 5 becomes more acutely angled on account of the centrifugal force, which is oriented in the radial direction 17. This means that the angle a between the first limb 9 and the second limb 10 become smaller. However, this also means that, during rotation, the gap between the first sealing surface 20 and the second sealing surface 21 becomes larger. When the shaft 2 is rotating, the mechanical seal 25 performs the main sealing action. The gas infeed 28 here is such that a predominant part of the gas fed flows into the gap between the first sealing surface 20 and the second sealing surface 21 and, as illustrated in FIG. 4, flows toward the interior space 24. As symbolized by the arrows 36, this effectively prevents contamination of a gas in the interior space 24 in the direction of the shaft-sealing arrangement 11, because the narrow gap 16 in the inner labyrinth generate a high velocity of the gas which ensure buffer action.

Wear to the lip seal 5 is effectively prevented on account of the centrifugal force.

Dry gas seals are comparatively susceptible to contamination from the interior space 24. The gas which is fed to the gas infeed 28 is usually process gas from the interior space 24, said process gas being reprocessed, filtered, etc., in elaborate installations and being fed to the mechanical seal 25. In the standstill state, the stream flowing out of the gas infeed 28 would not be sufficient to establish a counterpressure in relation to the contaminated gas from the interior space 24. The lip seal 5 according to the invention is therefore very effective, since it counteracts contamination from the interior space 24.

Without the lip seal 5 according to the invention, it would still be necessary to have a so-called gas booster which, in the standstill state, has to maintain a comparatively high inflow of gas via the gas infeed in order to exhibit a counterpressure in relation to the process gas prepared in the interior space 24. The invention, then, can dispense with such a booster.

Although the invention has been specifically illustrated and described in detail by way of the preferred exemplary embodiment, the invention is not restricted by the examples disclosed, and a person skilled in the art can deduce other variations therefrom without departing from the scope of protection of the invention.

The invention claimed is:

1. A shaft sealing arrangement, comprising:
    a shaft, which is mounted in a rotatable manner and extends along an axial axis,
    a stator, which is arranged around the shaft, and
    a rotating sealing ring, which is connected to the shaft,
    wherein a first gap is formed between the stator and the shaft,
    wherein the stator comprises a first sealing surface, which is arranged downstream of the first gap, as seen in a radial direction,
    wherein the sealing ring comprises a second sealing surface, which is arranged in a position opposite the first sealing surface,
    wherein a second gap is formed between the first sealing surface and the second sealing surface,
    a second sealing unit, which is arranged in the second gap, in the sealing ring, on the second sealing surface,
    wherein the stator comprises a recess, which is formed in a circumferential direction, wherein the first sealing surface is part of the recess and is arranged in a position opposite the first gap, and
    wherein the sealing ring comprises a protrusion, which projects into the recess such that the second sealing surface is arranged in a position opposite the first sealing surface.

2. The shaft sealing arrangement as claimed in claim 1, wherein the second sealing unit is designed such that it seals the second gap when the shaft is not rotating and opens the second gap when the shaft is rotating.

3. The shaft-sealing arrangement as claimed in claim 1, wherein the opening of the second gap is activated by centrifugal force.

4. The shaft sealing arrangement as claimed in claim 1, wherein the second sealing unit is designed in the form of a lip seal.

5. The shaft sealing arrangement as claimed in claim 4, wherein the lip seal has lip elements, wherein the lip elements form a V shape, as seen in cross section, wherein the V shape is designed to become more acutely angled under the influence of centrifugal force.

6. The shaft-sealing arrangement as claimed in claim 1, wherein the first sealing surface is formed essentially parallel to the axial axis.

7. The shaft-sealing arrangement as claimed in claim 1, wherein a first sealing unit is arranged in the first gap.

8. The shaft sealing arrangement as claimed in claim 7, wherein the first sealing unit, in the first gap is designed in the form of a labyrinth seal.

9. The shaft sealing arrangement as claimed in claim 1, further comprising:
    a mechanical seal, which is arranged adjacent to the sealing ring.

10. The shaft sealing arrangement as claimed in claim 9, wherein the mechanical seal is designed in the form of a dry gas seal.

11. The shaft sealing arrangement as claimed in claim 9, wherein the mechanical seal comprises a slide ring.

12. The shaft sealing arrangement as claimed in claim 9, further comprising:
    a gas infeed, which is designed such that a gas can be fed between the stator and the sealing ring.

13. The shaft sealing arrangement as claimed in claim 12, wherein the gas is a dry gas suitable for dry gas seals.

* * * * *